United States Patent [19]

Koroscil

[11] Patent Number: 4,717,511

[45] Date of Patent: Jan. 5, 1988

[54] CHEMILUMINESCENT COMPOSITION

[75] Inventor: Anthony Koroscil, Escambia, Fla.

[73] Assignee: American Cyanamid Company, Stamford, Conn.

[21] Appl. No.: 813,346

[22] Filed: Dec. 26, 1985

[51] Int. Cl.$^4$ .................. C09K 11/00; C07D 235/00
[52] U.S. Cl. .................. 252/700; 548/300; 252/582; 427/157
[58] Field of Search .............. 252/700, 582; 548/300; 427/157

[56] References Cited

U.S. PATENT DOCUMENTS

| | | | |
|---|---|---|---|
| 3,749,679 | 7/1973 | Rauhut | 252/700 |
| 3,816,326 | 6/1974 | Bollyky | 252/700 |
| 3,948,797 | 4/1976 | Vega | 252/700 |
| 3,974,368 | 8/1976 | Rauhut | 252/700 X |
| 3,994,820 | 11/1976 | Maulding et al. | 252/700 |
| 4,002,591 | 1/1977 | Gangneux | 524/720 X |
| 4,017,415 | 4/1977 | Doering | 252/700 |
| 4,064,064 | 12/1977 | Rauhut et al. | 252/700 |
| 4,076,645 | 2/1978 | Vega | 252/700 |
| 4,089,836 | 5/1978 | Gangneux | 524/90 |
| 4,191,680 | 3/1980 | Wegmann et al. | 524/556 X |
| 4,366,079 | 12/1982 | Rauhut et al. | 252/700 |
| 4,372,745 | 2/1983 | Mandle et al. | 252/700 X |
| 4,379,320 | 4/1983 | Mohan et al. | 252/700 |
| 4,401,585 | 8/1983 | Arthen, Jr. et al. | 252/700 |
| 4,407,743 | 10/1983 | Tseng | 252/700 |
| 4,462,931 | 7/1984 | Cohen | 252/700 |
| 4,547,317 | 10/1985 | Kamhi | 252/700 |
| 4,626,383 | 12/1986 | Richter et al. | 252/700 |
| 4,640,193 | 2/1987 | Koroscil | 252/700 X |

FOREIGN PATENT DOCUMENTS 1222190 11/1965 Fed. Rep. of Germany ... 252/188.7

Primary Examiner—Herbert B. Guynn
Assistant Examiner—Catherine S. Kilby
Attorney, Agent, or Firm—Frank M. Van Riet

[57] ABSTRACT

Compositions intended to be reacted with hydrogen peroxide to produce chemiluminescent light are disclosed wherein the compositions contain an oxalate and a fluorescer comprising 9,10-bis(4-methoxyphenyl)-2-chloroanthracene. A perylene dye may also be incorporated.

15 Claims, No Drawings

CHEMILUMINESCENT COMPOSITION

BACKGROUND OF THE INVENTION

The production of chemiluminescent light by the reaction of a catalyzed hydrogen peroxide solution with a fluorescer solution is well known in the art. Blue, green and yellow chemiluminescent light has been produced depending upon the particular fluorescer employed in the fluorescer solution. Examples of these prior are chemiluminescent light-systems can be found in one or more of the following U.S. Pat. Nos. 3,749,679; 3,391,068; 3,974,368; 3,557,233; 3,597,362; 3,775,336; 3,888,786.

One of the problems attendant the blue chemiluminescent light devices or systems of the prior art is that the light output is not as high as one would prefer. Furthermore, shade of the blue color emitted is not as satisfactory as consumers desire.

Accordingly, if a blue chemiluminescent system could be developed which exhibits a high light output upon activation and which exhibits a more pure blue color a long felt need would be satisfied.

SUMMARY OF THE INVENTION

Blue chemiluminescent compositions have now been developed which, when activated in the presence of hydrogen peroxide and a solvent exhibit, a pure blue color of high light output. Additionally, in the presence of a perylene dye, the compositions exhibit a white light which is whiter than exhibited of previous white light systems.

DESCRIPTION OF THE INVENTION INCLUDING PREFERRED EMBODIMENTS

The present invention is directed to compositions which are intended to be reacted with or activated by hydrogen peroxide in the presence of an organic solvent which composition comprises an oxalate and 9,10-bis(4-methoxy-phenyl)-2-chloroanthracene, each in sufficent quantity to result in visible chemiluminescent light.

The ability of the compositions of this present invention to exhibit a purer blue color than previous systems and at a higher light output is attributable to the fluorescer, i.e. the 9,10-bis(4-methoxyphenyl)-2-chloroanthracene. This fluorescer is a known compound, however, it has never been used in conjunction with chemiluminescent oxalates, activators and solvents etc., to provide blue chemiluminescent light, blue being a color which is difficult to achieve in chemiluminescent systems in both pure color and high intensity of light.

Two component chemiluminescent, liquid phase systems are well known in the art, see U.S. Pat. No. 4,313,843. Blue systems in the past have utilized 9,10-diphenyl anthracene as the fluorescer. Oxalates, such as those disclosed in U.S. Pat. Nos. 374,9679 and 3,816,316, which three patents are hereby incorporated herein by reference, may be used herein with bis(2,4,5-trichloro-6-carbopentoxyphenyl)oxalate being preferred. Substituted carbalkoxyphenyl oxalates constitute the preferred class of oxalates useful in the novel compositions hereof. The oxalate and the 9,10-bis(4-methoxyphenyl)-2-chlorathracene are each used in sufficient quantity to result in visible chemiluminescent light. It is preferred to utilize the oxalate and chloroanthracene in a molar ratio in the composition of from about 20-40 to 1, respectively, preferably from about 28-35 to 1.

The 9,10-bis(4-methoxyphenyl)-2-chloroanthracene is employed in the composition of the present invention in the range of from about 0.005 to about 0.0150 mole per liter of oxalate solution (i.e. the solvent solution of the oxalate and chloroanthracene), preferably from about 0.002 to about 0.008, same basis.

Useful catalysts include those disclosed in U.S. Pat. No. 3,775,336, hereby incorporated herein by reference, in the concentrations disclosed therein. A preferred catalyst is sodium salicylate.

The organic solvents useful herein include those known in the art and disclosed in the above-referenced U.S. patents. Preferred are esters, aromatic hydrocarbons and chlorinated hydrocarbons. Most preferred are dialkyl phthalates wherein the alkyl group contains 1-12 carbon atoms, inclusive. Dibutyl phthalate is exemplary.

As mentioned above, the compositions of the present invention also possess the ability to exhibit white light in the presence of a perylene dye. The soluble perylene dye when added to the chemiluminescent composition containing the 9,10-bis(4-methoxyphenyl)-2-chloroanthracene results in a white light instead of a blue light, the white light being a whiter white than previously obtained using other blue fluorescers. The amount of soluble perylene dye employed in the compositions of the present invention can range between $0.5 \times 10^{-3}$ to $7.0 \times 10^{-3}$, by weight, based on the total weight of the oxalate solution, preferably $2.0 \times 10^{-3}$ to $5.0 \times 10^{-3}\%$.

Any perylene dye which is soluble in the solvent solution used to produce the composition of the present invention may be used therein. Suitable perylene dyes include N,N'-bis(2,5-di-t-butylphenyl)-3,4,9,10-perylenedicarboximide. This red fluorescent dye has the structural formula:

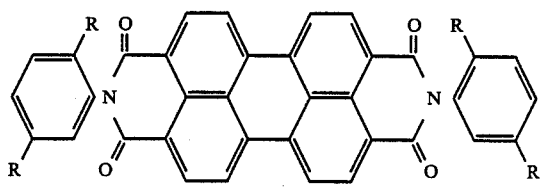

wherein each R is a t-butyl radical.

The novel compositions of the present invention are preferably prepared by merely blending the oxalate and the 9,10-bis(4-methoxyphenyl)-2-chloroanthracene in suitable quantities in the solvent of choice. Blue chemiluminescence is then achieved when the oxalate-fluorescer composition is mixed with a suitable activator composition containing hydrogen peroxides as is known in the art.

The novel compositions of the present invention containing the perylene dye may be prepared by any of three different methods. First a concentrate of the perylene dye in the fluorescer-oxalate system may be made and an aliquot of this solution added to the fluorescer-oxalate solution to obtain the desired mole ratio of perylene dye to fluorescer. Second, the required amount of perylene dye may be dissolved in the fluorescer-oxalate system to obtain ab initio the desired ratio fo perylene dye to fluorescer. Third, the required amount of perylene dye may be dissolved in the solvent and the final composition made by adding fluorescer and oxalate as required.

Chemiluminescence devices can be easily prepared utilizing known device components by adding the compositions of the present invention to e.g. a polyethylene tube. A sealed vial containing the solvent solution of catalyst and hydrogen peroxide is then placed in the oxalate solution in the tube which is then sealed. Chemiluminescence occurs when the tube is bent, the vial is broken and the mixture is shaken, by activation of the instant composition by the catalyst solution.

As explained above, the compositions of the present invention enable the production of non-pyroforic blue or white chemiluminescent light of high intensity and truer color.

The compositions of the present invention are useful where white light is required or desired, such as dark areas to read road maps, signs and directions, where no electrical power exists or where white or blue light is used i.e., for aesthetic effects, such as in novelty devices and displays. They are useful under water, as fishing lures, signals, and in scuba diving and the like.

The following examples are set forth for purposes of illustration only and are not to be construed as limitations on the present invention except as set forth in the appended claims. All parts and percentages are by weight unless otherwise specified.

EXAMPLE 1

(A) To a suitable vessel are added 91.274 parts of dibutyl phthalate which is heated to 150° C. and purged with nitrogen gas. 8.6 Parts of bis(2,4,5-trichloro-6-carbopentoxyphenyl)oxalate are then added, with stirring, until the oxalate is dissolved. To the resultant solution is then added 0.165 part of 9,10-bis(4-methoxyphenyl)-2-chloroanthracene. The resultant solution is called Solution A.

(B) To a second vessel are added 81.45 parts of dimethylphthalate and 13.32 parts of t-butyl alcohol. To this mixture are added 5.23 parts of 90% hydrogen peroxide and 0.0091 part of sodium salicylate. The resultant solution is called Solution B.

To three parts by volume of Solution A is added 1 part by volume of Solution B. The result is the generation of a blue chemiluminescent light.

EXAMPLE 2 (comparative)

The procedure of Example 1 is again followed except that the 9,10-bis(4-methoxyphenyl)-2-chloroanthracene is replaced by an equivalent amount of 9,10-diphenylanthracene. Again a blue chemiluminescent light is obtained upon mixing the resultant solution with Solution B.

The amount of light output (LOP) for the systems produced in Examples 1 and 2 is measured in a luminometer over a period of 8 hours. The results are as follows in Table I.

TABLE I

| | Total LOP-Lumens per liter |
|---|---|
| Example 1 | 28,790 |
| Example 2 | 25,334 |

It can therefore be seen that the use of the composition of the present invention results in 13.6% higher light output over the same period of time as compared to the systems of the prior art.

EXAMPLE 3

The procedure of Example 1 is again followed except that 0.003% of N,N'-bis(2,5-di-tert butylphenyl)-3,4,9,10-perylene dicarboximide is incorporated into Solution A. Upon mixing the resultant solution with Solution B, white light results, said white light being of a whiter color than when the fluorescer is 9,10-diphenylanthracene.

EXAMPLES 4-6

Substitution of the following oxalates, for that of Solution A in Example 1, again results in a blue chemiluminescent light of high intensity: (4) bis(6-carboxy-2,4,5-trichlorophenyl)oxalate; (5) bis(4-carboxy,2,6,-dichlorophenyl)oxalate; and (6) bis(2,3-dicarboxy-4,5,6-trichlorophenyl)oxalate.

EXAMPLE 7

The procedure of Example 1 is again followed except that the catalyst of Solution B is rubidium acetate. Similar results are achieved.

I claim:

1. A composition adapted to be reacted with hydrogen peroxide to provide chemiluminescent blue light, said composition containing the ingredients (1) an oxalate compound and (2) 9,10-bis(4-methoxyphenyl)-2-chloroanthracene, the amounts of said ingredients being such as to provide visible blue light.

2. A composition according to claim 1, including in addition thereto, an activator.

3. A composition according to claim 1 comprising, in addition thereto, a solvent for said oxalate and said chloroanthracene.

4. A composition according to claim 1 wherein said oxalate is a substituted carbalkoxyphenyl oxalate.

5. A composition according to claim 4 wherein said oxalate is bis(2,4,5-trichloro-6-carbopentoxyphenyl)oxalate.

6. A composition according to claim 3 wherein said solvent is dibutyl phthalate.

7. A composition according to claim 2 wherein said activator is sodium salicylate.

8. A composition according to claim 2 wherein said activator is a dimethyl phthalate/t-butyl alcohol solution of sodium salicylate.

9. A composition according to claim 1 including, in addition thereto, an activator and a solvent for said oxalate and said chloranthracene.

10. A composition according to claim 1 wherein the molar ratio of oxalate to chloroanthracene ranges from about 20-40 to 1, respectively.

11. A composition according to claim 3 wherein the concentration of chloroanthracene in the composition ranges from about 0.005 to about 0.0150 mole per liter of oxalate solution.

12. A composition adapted to be reacted with hydrogen peroxide to provide chemiluminescent white light, said composition containing the ingredients (1) an oxalate compound, (2) 9,10-bis(4-methoxy-phenyl)-2-chloroanthracene and (3) a soluble perylene dye, the amounts of said ingredients being such as to provide visible white light.

13. A composition according to claim 12 wherein said perylene dye is N,N'-bis(2,5-di-t-butylphenyl)-3,4,9,10-perylenedicarboximide.

14. A method for producing a blue chemiluminescent light which comprises adding to the composition of claim 1 a solution of hydrogen peroxide and a basic catalyst.

15. A method for producing a white chemiluminescent light which comprises adding to the composition of claim 12 a solution of hydrogen peroxide and a basic catalyst.

* * * * *